(12) United States Patent
Hiraga

(10) Patent No.: US 11,843,284 B2
(45) Date of Patent: Dec. 12, 2023

(54) ROTOR OF ROTARY ELECTRIC MACHINE AND ROTARY ELECTRIC MACHINE

(71) Applicant: HONDA MOTOR CO., LTD., Tokyo (JP)

(72) Inventor: Kazuhito Hiraga, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 17/676,843

(22) Filed: Feb. 22, 2022

(65) Prior Publication Data

US 2022/0311293 A1    Sep. 29, 2022

(30) Foreign Application Priority Data

Mar. 26, 2021    (JP) .................................. 2021-052845

(51) Int. Cl.
 *H02K 1/27*    (2022.01)
 *H02K 1/276*   (2022.01)
 *H02K 29/03*   (2006.01)

(52) U.S. Cl.
 CPC ............. *H02K 1/276* (2013.01); *H02K 29/03* (2013.01)

(58) Field of Classification Search
 CPC ........ H02K 1/276; H02K 29/03; H02K 21/14; H02K 1/2766; H02K 2213/03; H02K 1/2706; H02K 1/278; Y02T 10/64
 See application file for complete search history.

(56) References Cited

U.S. PATENT DOCUMENTS

| | | | |
|---|---|---|---|
| 2008/0036331 A1* | 2/2008 | Mizutani ................ | H02K 1/278 310/269 |
| 2017/0324311 A1 | 11/2017 | Tsutsui | |

FOREIGN PATENT DOCUMENTS

| | | |
|---|---|---|
| JP | 2017204906 A | 11/2017 |
| JP | 6416826 B2 | 10/2018 |
| JP | 2020096426 A | 6/2020 |
| JP | 2020129861 A | 8/2020 |

* cited by examiner

*Primary Examiner* — Thomas Truong
(74) *Attorney, Agent, or Firm* — CKC & Partners Co., LLC

(57) ABSTRACT

Provided are a rotor of a rotary electric machine, and a rotary electric machine, in which torque ripple can be efficiently reduced with a simple configuration. In the rotor of the rotary electric machine which is rotatably disposed in a stator, and the rotary electric machine including the stator, and the rotor rotatably disposed in the stator, two or more magnets are arranged per pole, and arranged such that separation distances, between the two or more magnets per pole along a circumferential direction of the rotor, alternately vary every pole along the circumferential direction of the rotor.

6 Claims, 5 Drawing Sheets

ROTOR OF ROTARY ELECTRIC MACHINE AND ROTARY ELECTRIC MACHINE

This application is based on and claims the benefit of priority from Japanese Patent Application No. 2021-052845, filed on 26 Mar. 2021, the content of which is incorporated herein by reference.

BACKGROUND OF THE INVENTION

Field of the Invention

The present invention relates to a rotor of a rotary electric machine, and a rotary electric machine.

Related Art

In a hybrid car or an electric car, a rotary electric machine is mounted. It is known that in the rotary electric machine, torque ripple (torque pulsation) is generated and is one of factors of pulsation during low speed running, noise during high speed running and vibration.

Conventionally, various attempts are made to reduce torque ripple of the rotary electric machine. For example, Patent Document 1 discloses that the attempts include alternately changing slot and coil shapes in a circumferential direction of a stator, forming salient pole portions of plural poles in a circumferential direction of a rotor, and forming an inclined surface on a corner at each of opposite ends of each salient pole portion in the circumferential direction. Patent Document 2 discloses that the attempts include forming a groove in an outer circumferential surface of a rotor and providing a deforming member that deforms a groove shape to deepen the groove as torque generated in a rotary electric machine increases. Patent Document 3 discloses that the attempts include dividing a stator in an axial direction, alternately varying lengths of teeth of each stator, and arranging the stators such that a long tooth overlaps a short tooth between the stators in the axial direction.

Patent Document 1: Japanese Unexamined Patent Application, Publication No. 2017-204906
Patent Document 2: Japanese Patent No. 6416826
Patent Document 3: Japanese Unexamined Patent Application, Publication No. 2020-129861

SUMMARY OF THE INVENTION

In each of above conventional arts, however, to reduce torque ripple, a plurality of types of coils need to be used, or a rotor or a stator needs to be specially processed. Therefore, there is a problem that a structure of a rotary electric machine is complicated and increases cost and that the torque ripple cannot be efficiently reduced.

An object of the present invention is to provide a rotor of a rotary electric machine, and a rotary electric machine, in which torque ripple can be efficiently reduced with a simple configuration.

(1) A rotor of a rotary electric machine of the present invention is a rotor (e.g., an after-mentioned rotor 3) of a rotary electric machine (e.g., an after-mentioned rotary electric machine 1 or 10) which is rotatably disposed in a stator (e.g., an after-mentioned stator 2), the rotor including two or more magnets (e.g., after-mentioned magnets 41 or 42) arranged per pole, and arranged such that separation distances (e.g., after-mentioned separation distances D1 and D2 or D10 and D20), between the two or more magnets per pole along a circumferential direction (e.g., an after-mentioned X-direction) of the rotor, alternately vary every pole along the circumferential direction of the rotor.

(2) A rotary electric machine of the present invention is a rotary electric machine (e.g., an after-mentioned rotary electric machine 1 or 10) including a stator (e.g., an after-mentioned stator 2), and a rotor (e.g., an after-mentioned rotor 3) rotatably disposed in the stator, the rotor including two or more magnets (e.g., after-mentioned magnets 41 or 42) arranged per pole, and arranged such that separation distances (e.g., after-mentioned separation distances D1 and D2 or D10 and D20), between the two or more magnets per pole along a circumferential direction (e.g., an after-mentioned X-direction) of the rotor, alternately vary every pole along the circumferential direction of the rotor.

In the rotor of the rotary electric machine according to the above (1), the magnets are arranged such that the separation distances, between the two or more magnets per pole along the circumferential direction of the rotor, alternately vary every pole along the circumferential direction of the rotor, so that magnetisms of magnets of magnetic poles adjacent to each other in the circumferential direction of the rotor are alternately provided to be "large", "small", "large", and "small". Consequently, due to magnetic pole fluctuation of a coil caused by alternating current, maximum torques at maximum voltages in the magnetic poles adjacent to each other in the circumferential direction overlap each other at the "large" and "small" magnetisms, so that torque fluctuation occurring in the rotor during follow-up rotation can be suppressed, and torque ripple can be reduced. Therefore, the rotary electric machine capable of efficiently reducing torque ripple with a simple configuration can be provided. A plurality of types of stator coils do not have to be used, and the stator and rotor do not have to be specially processed, so that there is no concern of cost increase.

According to the rotary electric machine described in the above (2), the magnets are arranged such that the separation distances, between two or more magnets per pole along the circumferential direction of the rotor, alternately vary every pole along the circumferential direction of the rotor, and the magnetisms of the magnets of the magnetic poles adjacent to each other in the circumferential direction of the rotor are alternately provided to be "large", "small", "large", and "small". Consequently, due to the magnetic pole fluctuation of the coil caused by the alternating current, "large" and "small" maximum torques at the maximum voltages in the magnetic poles adjacent to each other in the circumferential direction overlap each other, so that the torque fluctuation occurring in the rotor during the follow-up rotation of the rotor can be suppressed, and the torque ripple can be reduced. Therefore, the torque ripple can be efficiently reduced with a simple configuration. The plurality of types of stator coils do not have to be used, and the stator and rotor do not have to be specially processed, so that there is no concern of cost increase.

DETAILED DESCRIPTION OF THE INVENTION

Figure 1:
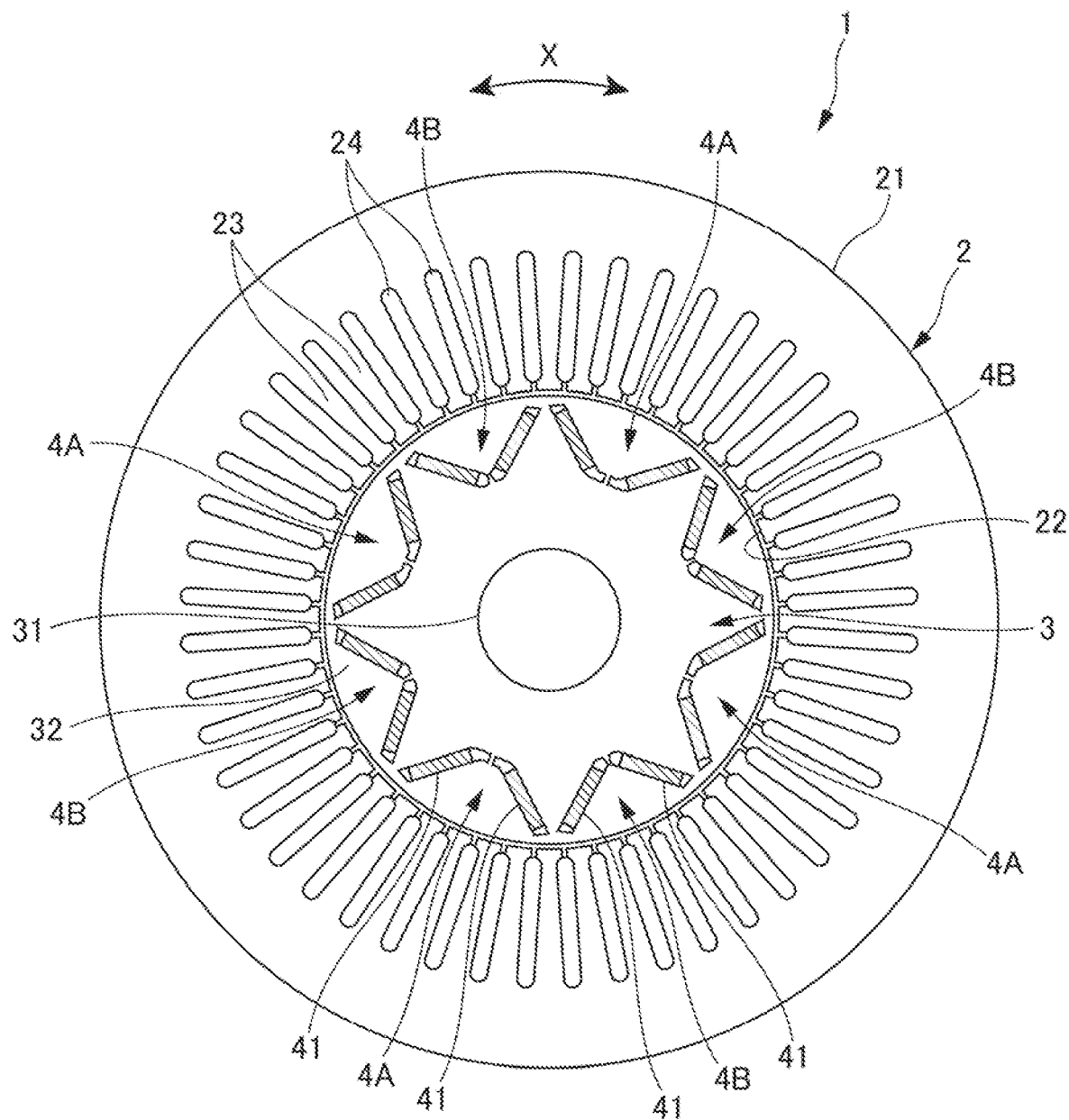
FIG. 1 is a cross-sectional view showing a rotary electric machine according to a first embodiment of the present invention.
Figure 2:
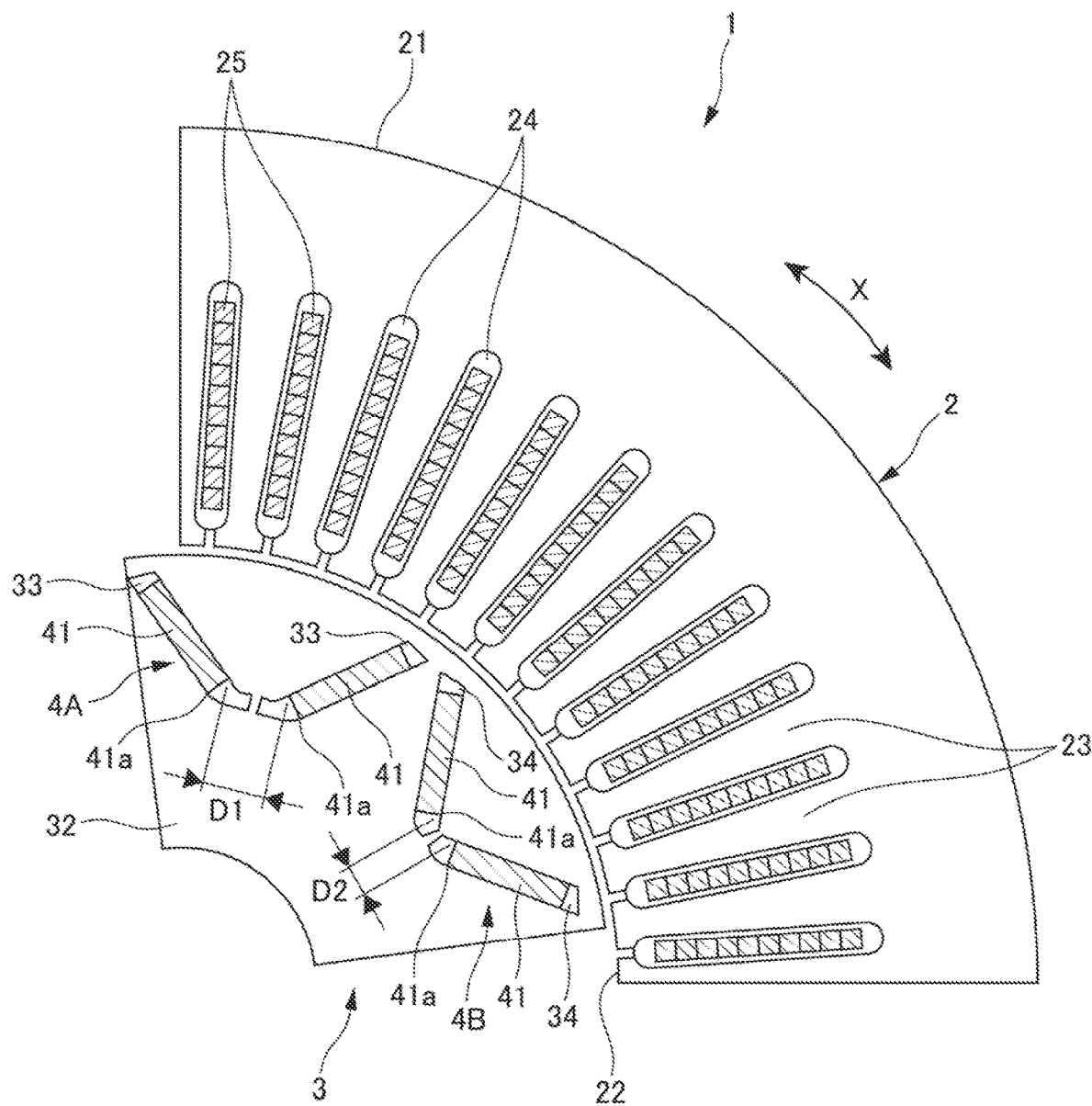
FIG. 2 is an enlarged cross-sectional view showing an arrangement structure of magnets of two magnetic poles adjacent to each other in a circumferential direction of the rotary electric machine in FIG. 1.

Hereinafter, description will be made in detail as to embodiments of the present invention with reference to the drawings. FIGS. 1 and 2 are cross-sectional views showing a rotary electric machine according to a first embodiment of the present invention. A rotary electric machine 1 includes a stator 2 and a rotor 3.

The stator 2 includes, for example, a stator core 21 including a stacked body of a plurality of stacked thin core plates. The stator core 21 includes a shaft hole 22 penetrating a center in an axial direction, a plurality of teeth 23 arranged radially toward the shaft hole 22, and a plurality of slots 24 formed between teeth 23 and 23 adjacent to each other and opened toward the shaft hole 22. A coil 25 is inserted into each slot 24. FIG. 1 does not show any coils 25. Note that in the stator 2 and the stator core 21, as shown by arrows in FIGS. 1 and 2, an X-direction along which the slots 24 are arranged is a circumferential direction, and a vertical direction to a paper surface in FIGS. 1 and 2 is the axial direction.

The rotor 3 includes a rotary shaft 31 and a rotor core 32. The rotary shaft 31 is rotatably supported by the stator 2. The rotor core 32 is cylindrically provided in an outer circumferential surface of the rotary shaft 31, and the outer circumferential surface is disposed in the shaft hole 22 to be close to the teeth 23 of the stator core 21. Note that in the rotor 3 and the rotor core 32, as shown by arrows in FIGS. 1 and 2, the X-direction is the circumferential direction, and the vertical direction to the paper surface in FIGS. 1 and 2 is the axial direction.

The rotor 3 of the first embodiment includes eight magnetic poles arranged along the circumferential direction. The eight magnetic poles include four magnetic poles 4A, and four magnetic poles 4B different in magnetism from the magnetic poles 4A. The magnetic poles 4A and 4B are alternately arranged along the circumferential direction of the rotor core 32.

In the rotor core 32, as shown in FIG. 2, a pair of magnet insertion holes 33 or 34 arranged in a V-shape opened toward an outer circumference are provided in each magnetic pole 4A or 4B. The magnet insertion holes 33 are provided in the magnetic pole 4A, and the magnet insertion holes 34 are provided in the magnetic pole 4B. The magnet insertion holes 33 and 34 penetrate the rotor core 32 in the axial direction. Magnets 41 having the same shape are inserted into two magnet insertion holes 33 or 34 of each magnetic pole 4A or 4B. Consequently, two magnets 41 are arranged in the V-shape in each of the magnetic poles 4A and 4B.

An angle of the V-shape of two magnets 41 of the magnetic pole 4A is the same as that of two magnets 41 of the magnetic pole 4B. As shown in FIG. 2, however, a separation distance D1 between two magnets 41 of the magnetic pole 4A and a separation distance D2 between two magnets 41 of the magnetic pole 4B are different and have a relation of D1>D2. Thus, two magnets 41 per pole are arranged in the rotor 3 such that the separation distances D1 and D2 alternately vary every pole along the circumferential direction of the rotor 3. Consequently, magnetisms of the magnetic poles 4A and 4B adjacent to each other in the circumferential direction of the rotor 3 are alternately provided to be "large", "small", "large", and "small". Note that the separation distance between two magnets 41 arranged in the V-shape in one magnetic pole as in the present embodiment is the shortest distance between end portions 41a of the magnets 41 on a V-shape base side. The end portions 41a are end portions on the side where the two magnets 41 are close to each other.

Figure 3:
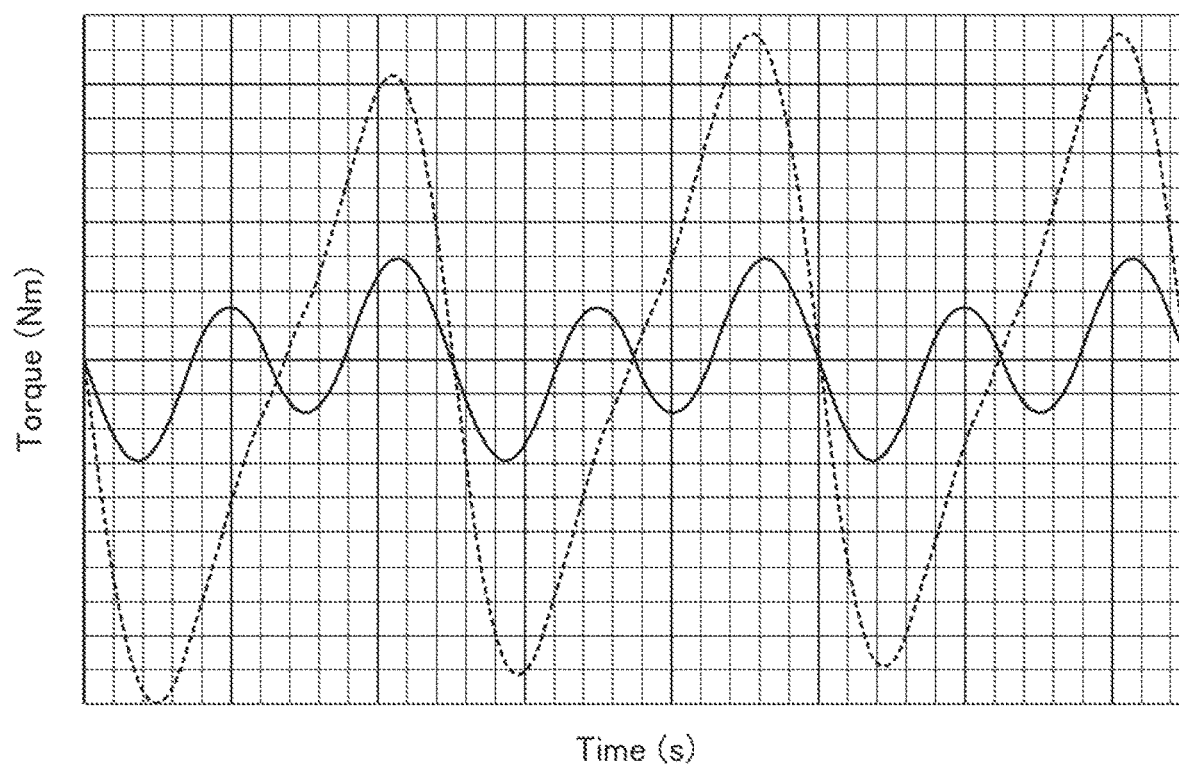
FIG. 3 is a graph showing torque fluctuation in the rotary electric machine shown in FIG. 1.

FIG. 3 is a graph showing torque fluctuation of the rotor 3 in the rotary electric machine 1 of the first embodiment. A solid line shows the torque fluctuation of the rotor 3 of the rotary electric machine 1 of the first embodiment where the magnets are arranged such that the separation distances D1 and D2, between two magnets 41 arranged per pole, alternately vary every pole along the circumferential direction of the rotor 3, and a dashed line shows torque fluctuation of a rotary electric machine in a case where a separation distance between two magnets 41 is uniform in all magnetic poles.

As shown in FIG. 3, it is seen that the torque fluctuation occurring in the rotor 3 of the rotary electric machine 1 of the first embodiment is suppressed more than the torque fluctuation in the case where the separation distance between two magnets 41 is uniform in the respective magnetic poles. This is because the magnetisms of the magnetic poles 4A and 4B adjacent to each other in the circumferential direction of the rotor 3 of the rotary electric machine 1 are alternately provided to be "large", "small", "large", and "small", and in a case where alternating current is applied to the coil 25 of the stator 2, due to magnetic pole fluctuation of the coil 25 caused by the alternating current, "large" and "small" maximum torques at maximum voltages in the magnetic poles 4A and 4B adjacent to each other in the circumferential direction overlap each other. Thus, the torque fluctuation occurring in the rotor 3 during follow-up rotation of the rotor 3 is suppressed, and as a result, torque ripple of the rotary electric machine 1 is reduced. Therefore, according to the rotary electric machine 1 including the rotor 3 in the first embodiment, the torque ripple can be efficiently reduced with a simple configuration where the separation distances D1 and D2, between the magnets 41, vary with the magnetic poles 4A and 4B. A plurality of types of coils 25 do not have to be used, and the stator 2 and rotor 3 do not have to be specially processed, so that there is no concern of cost increase.

Figure 4:
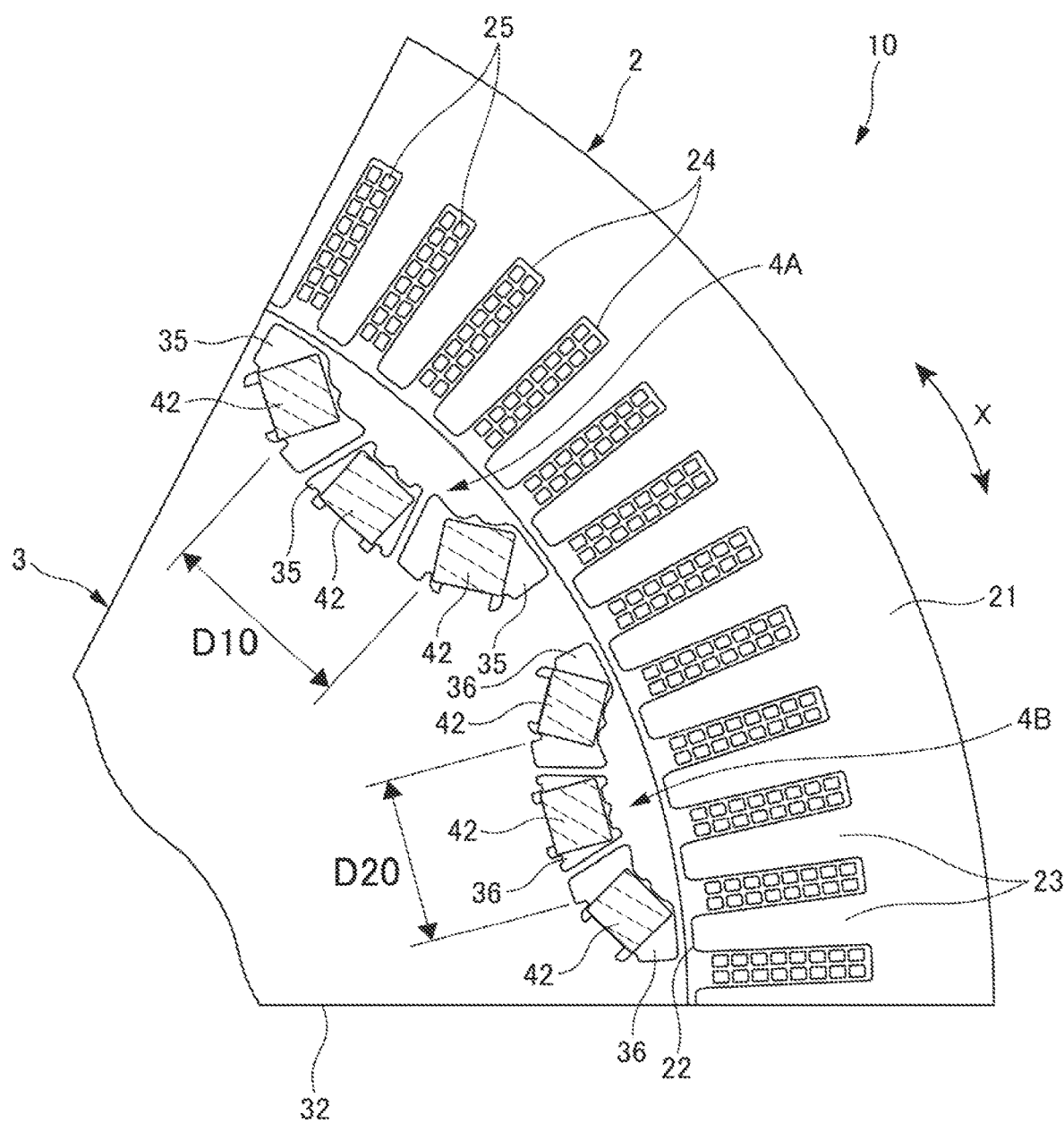
FIG. 4 is an enlarged cross-sectional view showing an arrangement structure of magnets of two magnetic poles adjacent to each other in a circumferential direction of a rotary electric machine according to a second embodiment of the present invention.

FIG. 4 is a cross-sectional view showing a rotary electric machine 10 according to a second embodiment of the present invention. Parts denoted with the same reference numeral as in the rotary electric machine 1 according to the first embodiment shown in FIGS. 1 and 2 indicate the parts having the same configuration, and hence the above description is used for detailed description and is not repeated below.

In a rotor core 32 of the rotary electric machine 10 according to the second embodiment, three magnet insertion holes 35 or 36 are provided per pole. The magnet insertion holes 35 are provided in a magnetic pole 4A, and the magnet insertion holes 36 are provided in a magnetic pole 4B. The magnet insertion holes 35 and 36 penetrate the rotor core 32 in an azial direction. The three magnet insertion holes 35 or 36 are arranged side by side in a circumferential direction of the rotor core 32. Two magnet insertion holes 35 or 36 are arranged on opposite sides of the magnet insertion hole 35 or 36 in a center of each magnetic pole 4A or 4B, respectively, such that outer ends of the holes in the circumferential direction deviate slightly outward in a radial direction.

Magnets 42 are inserted into three magnet insertion holes 35 or 36 of each of the magnetic poles 4A and 4B. Consequently, three magnets 42 are arranged in each of the magnetic poles 4A and 4B.

Three magnets 42 of the magnetic pole 4A and three magnets 42 of the magnetic pole 4B are arranged in substantially arc shapes to form concaves toward outside in the radial direction, respectively. As shown in FIG. 4, however, a separation distance D10 of three magnets 42 of the magnetic pole 4A and a separation distance D20 of three magnets 42 of the magnetic pole 4B are different and have a relation of D10>D20. Therefore, in the rotor 3, three magnets 42 per pole are arranged such that the separation distances D10 and D20 alternately vary every pole along the circumferential direction of the rotor 3. Consequently, magnetisms of the magnetic poles 4A and 4B adjacent to each other in the circumferential direction of the rotor 3 are alternately provided to be "large", "small", "large", and "small". Note that the separation distance of three magnets 42 arranged in the substantially arc shape in one magnetic pole as in the second embodiment is the shortest distance between two magnets 42 and 42 at opposite ends.

Figure 5:
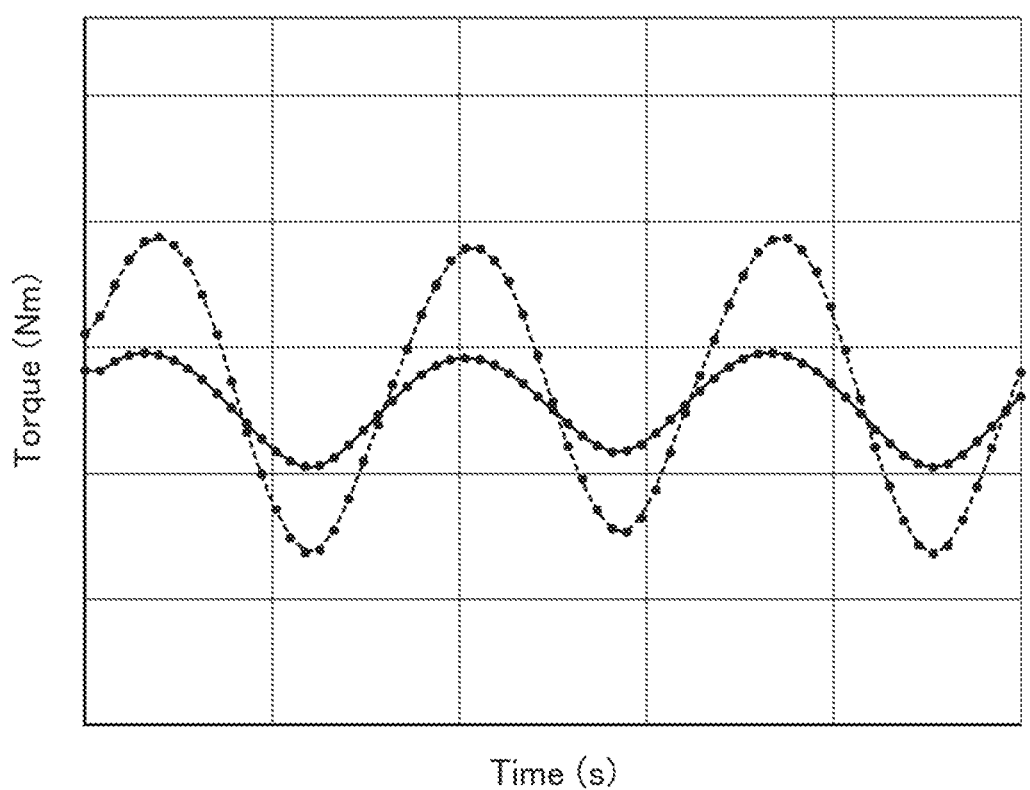
FIG. 5 is a graph showing torque fluctuation in the rotary electric machine shown in FIG. 4.

FIG. 5 is a graph showing torque fluctuation of the rotor 3 in the rotary electric machine 10 of the second embodiment. A solid line shows the torque fluctuation of the rotor 3 of the rotary electric machine 10 of the second embodiment where the magnets are arranged such that the separation distances D10 and D20, among three magnets 42 arranged per pole, alternately vary every pole along the circumferential direction of the rotor 3 as described above, and a dashed line shows torque fluctuation of a rotary electric machine in a case where a separation distance among three magnets 42 is uniform in all magnetic poles.

As shown in FIG. 5, it is seen that the torque fluctuation occurring in the rotor 3 of the rotary electric machine 10 of the second embodiment is suppressed more than the torque fluctuation in the case where the separation distance among three magnets 42 is uniform in the respective magnetic poles, for reasons similar to those of the rotary electric machine 1 of the first embodiment. Thus, torque ripple of the rotary electric machine 10 is reduced, and hence according to the rotary electric machine 10 including the rotor 3 in the second embodiment, effects similar to those of the rotary electric machine 1 including the rotor 3 in the first embodiment can be obtained.

As above, the rotor 3 of the rotary electric machine 1 or 10 is the rotor 3 of the rotary electric machine 1 or 10 which is rotatably disposed in the shaft hole 22 of the stator 2, and the rotor includes two or more magnets 41 or 42 arranged per pole, and arranged such that the separation distances D1 and D2 or D10 and D20, between the two or more magnets 41 or 42 per pole along the circumferential direction of the rotor 3, alternately vary every pole along the circumferential direction of the rotor 3. Consequently, the rotary electric machine can be provided in which torque fluctuation occurring in the rotor 3 during rotation can be suppressed, and torque ripple can be efficiently reduced with a simple configuration. A plurality of types of coils 25 do not have to be used in the stator 2, and the stator 2 and rotor 3 do not have to be specially processed, so that there is no concern of cost increase.

Also, as above, the rotary electric machine 1 or 10 includes the stator 2, and the rotor 3 rotatably disposed in the shaft hole 22 of the stator 2, and the rotor 3 includes two or more magnets 41 or 42 arranged per pole, and arranged such that the separation distances D1 and D2 or D10 and D20, between the two or more magnets 41 or 42 per pole along the circumferential direction of the rotor 3, alternately vary every pole along the circumferential direction of the rotor 3. Thus, the torque fluctuation occurring in the rotor 3 during follow-up rotation of the rotor 3 can be suppressed, and the torque ripple can be efficiently reduced with the simple configuration. The plurality of types of coils 25 do not have to be used in the stator 2, and the stator 2 and rotor 3 do not have to be specially processed, so that there is no concern of cost increase.

EXPLANATION OF REFERENCE NUMERALS 1 and 10 rotary electric machine
2 stator
3 rotor
4A and 4B magnetic pole
41 and 42 magnet
D1, D2, D10, and D20 separation distance

What is claimed is:

1. A rotor of a rotary electric machine which is rotatably disposed in a stator,
the rotor comprising:
two or more magnets arranged per pole, and arranged such that separation distances, between the two or more magnets per pole along a circumferential direction of the rotor, alternately vary every pole along the circumferential direction of the rotor, wherein
the magnets arranged in every pole have an identical shape.

2. The rotor according to claim 1, wherein
two magnets are arranged in a V-shape in each pole, and the V-shape has an identical angle in every pole.

3. The rotor according to claim 2, wherein
the separation distance is a shortest distance between end portions of the magnets, the end portions being on a base side of the V-shape.

4. A rotary electric machine comprising:
a stator; and
a rotor rotatably disposed in the stator,
the rotor comprising two or more magnets arranged per pole, and arranged such that separation distances, between the two or more magnets per pole along a circumferential direction of the rotor, alternately vary every pole along the circumferential direction of the rotor, wherein
the magnets arranged in every pole have an identical shape.

5. The rotary electric machine according to claim 2, wherein
three or more magnets are arranged in an arc shape in each pole, and the arc shape has an identical angle in every pole.

6. The rotary electric machine according to claim 5, wherein the separation distance is a shortest distance between two magnets at opposite ends of each pole.

* * * * *